(12) United States Patent
Turcu et al.

(10) Patent No.: US 10,079,720 B2
(45) Date of Patent: Sep. 18, 2018

(54) DYNAMICALLY MANAGING DIFFERENT VERSIONS OF A SERVICE

(71) Applicant: Microsoft Technology Licensing, LLC, Redmond, WA (US)

(72) Inventors: Septimiu Turcu, Copenhagen (DK); Michael Riddersholm Petersen, Copenhagen (DK); Christian Heide Damm, Gentofte (DK); Esteban Maximilian Ardaya Hecki, Vallensbaek Strand (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/152,842

(22) Filed: May 12, 2016

(65) Prior Publication Data

US 2016/0380808 A1    Dec. 29, 2016

Related U.S. Application Data

(60) Provisional application No. 62/183,550, filed on Jun. 23, 2015.

(51) Int. Cl.
*H04L 29/08* (2006.01)
*H04L 12/24* (2006.01)
*G06F 8/71* (2018.01)
*G06F 9/445* (2018.01)

(52) U.S. Cl.
CPC .............. *H04L 41/082* (2013.01); *G06F 8/71* (2013.01); *G06F 9/44521* (2013.01); *G06F 9/44536* (2013.01); *H04L 41/0853* (2013.01); *H04L 67/16* (2013.01); *H04L 67/34* (2013.01)

(58) Field of Classification Search
CPC ..................................................... H04L 41/082
USPC ......................................................... 709/221
See application file for complete search history.

(56) References Cited

U.S. PATENT DOCUMENTS

| | | | |
|---|---|---|---|
| 7,127,526 B1 | 10/2006 | Duncan et al. | |
| 7,287,259 B2 | 10/2007 | Grier et al. | |
| 7,703,089 B2 | 4/2010 | Birenheide | |
| 8,276,121 B2 | 9/2012 | Miller et al. | |
| 8,522,227 B2 | 8/2013 | Santos et al. | |
| 8,695,001 B2 | 4/2014 | Mathew et al. | |
| 2002/0100017 A1 | 7/2002 | Grier et al. | |
| 2003/0033590 A1* | 2/2003 | Leherbauer | G06F 8/71 717/122 |
| 2004/0168153 A1 | 8/2004 | Marvin | |
| 2008/0133590 A1 | 6/2008 | Blanch et al. | |
| 2009/0158303 A1 | 6/2009 | Saborowski | |
| 2012/0174124 A1 | 7/2012 | Ward et al. | |

(Continued)

OTHER PUBLICATIONS

Second Written Opinion for International Patent Application No. PCT/US2016/033714, dated May 24, 2017, date of filing: May 23, 2016, 9 pages.

(Continued)

*Primary Examiner* — Adnan Mirza
(74) *Attorney, Agent, or Firm* — Christopher J. Volkmann; Kelly, Holt & Christenson, PLLC

(57) ABSTRACT

A management portal receives an input indicating that a management operation is to be performed on a service. The management portal dynamically hosts a management interface for performing the management operation on different versions of the service.

20 Claims, 8 Drawing Sheets

(56) References Cited

U.S. PATENT DOCUMENTS

2014/0366045 A1   12/2014   West et al.
2015/0074259 A1*   3/2015   Ansari .................... H04L 67/02
                                                                   709/224
2015/0100952 A1   4/2015   Tornow et al.

OTHER PUBLICATIONS

International Preliminary Report on Patentability for International Patent Application No. PCT/US2016/033714, dated Aug. 21, 2017, date of filing: May 23, 2016, 10 pages.
"Simplifying Deployment and Solving DLL Hell with the .NET Framework" Published on: Oct. 22, 2008 Available at: https://msdn.microsoft.com/en-us/library/ms973843.aspx.
"Dynamic Assembly Resolution/Management",Retrieved on: Jun. 17, 2015 Available at: http://stackoverflow.com/questions/8641799/dynamic-assembly-resolution-management.
Kon, et al., "Dynamic Resource Management and Automatic Configuration of Distributed Component Systems", In Proceedings of the 6th conference on USENIX Conference on Object-Oriented Technologies and Systems—vol. 6, Jan. 29, 2001, 40 pages.
Abilov, Vagif., "Managing Assembly Version Numbers using Visual Studio .NET and Visual SourceSafe", Published on: May 25, 2004 Available at: http://www.codeproject.com/Articles/7178/Managing-assembly-version-numbers-using-Visual-Stu.
Jackson, Steven L., "The Right Way to Version Your Assemblies", Published on: Feb. 13, 2012 Available at: http://www.codeproject.com/Articles/328977/The-Right-Way-to-Version-Your-Assemblies.
International Search Report and Written Opinion for International Application No. PCT/US2016/033714, dated Jul. 19, 2016, date of filing: May 23, 2016, 17 pages.
Ricky Rainey: "Calling Azure Service Management REST API's from C#: Rick Rainey", Oct. 17, 2013, Retrieved from the Internet: URL:https://web.archive.orf/web/20150429100130/http://rickrainey.com/2013/10/17/calling-azure-service-management-rest-apis-from-c, Retrieved on: Jul. 8, 2016, 12 pages.

* cited by examiner

DYNAMICALLY MANAGING DIFFERENT VERSIONS OF A SERVICE

CROSS-REFERENCE TO RELATED APPLICATION

The present application is based on and claims the benefit of U.S. provisional patent application Ser. No. 62/183,550, filed Jun. 23, 2015, the content of which is hereby incorporated by reference in its entirety.

BACKGROUND

Computer systems are currently in wide use. Some computer systems are deployed in a hosting environment and host one or more services for different tenants or users. It is not uncommon for such a hosting system to host different versions of the same service for different users or tenants.

A host system often allows an administrator to perform management operations on the different versions of the service that are being hosted. For instance, the administrator may wish to add one or more additional users to a service. The administrator may wish to perform management operations that manage access rights and credentials on one or more of the different versions of the service. The administrator may also wish to move tenants among the various different versions of the service. For instance, a tenant may be upgraded to a newer version of a service, and is then moved from an older version of the service to the newer version.

It is also common for each version of a service to implement a common management application programming interface (or API) in a management assembly. By consuming this API, an administration system can perform management operations on the service. However, such management assemblies are often tightly coupled to the particular version of the service that they are used to manage. Thus, the consumer of the management API is unable to perform operations, which cross multiple versions of a service.

The discussion above is merely provided for general background information and is not intended to be used as an aid in determining the scope of the claimed subject matter.

SUMMARY

A management portal receives an input indicating that a management operation is to be performed on a service. The management portal dynamically hosts different management interfaces for performing the management operations on different versions of the service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
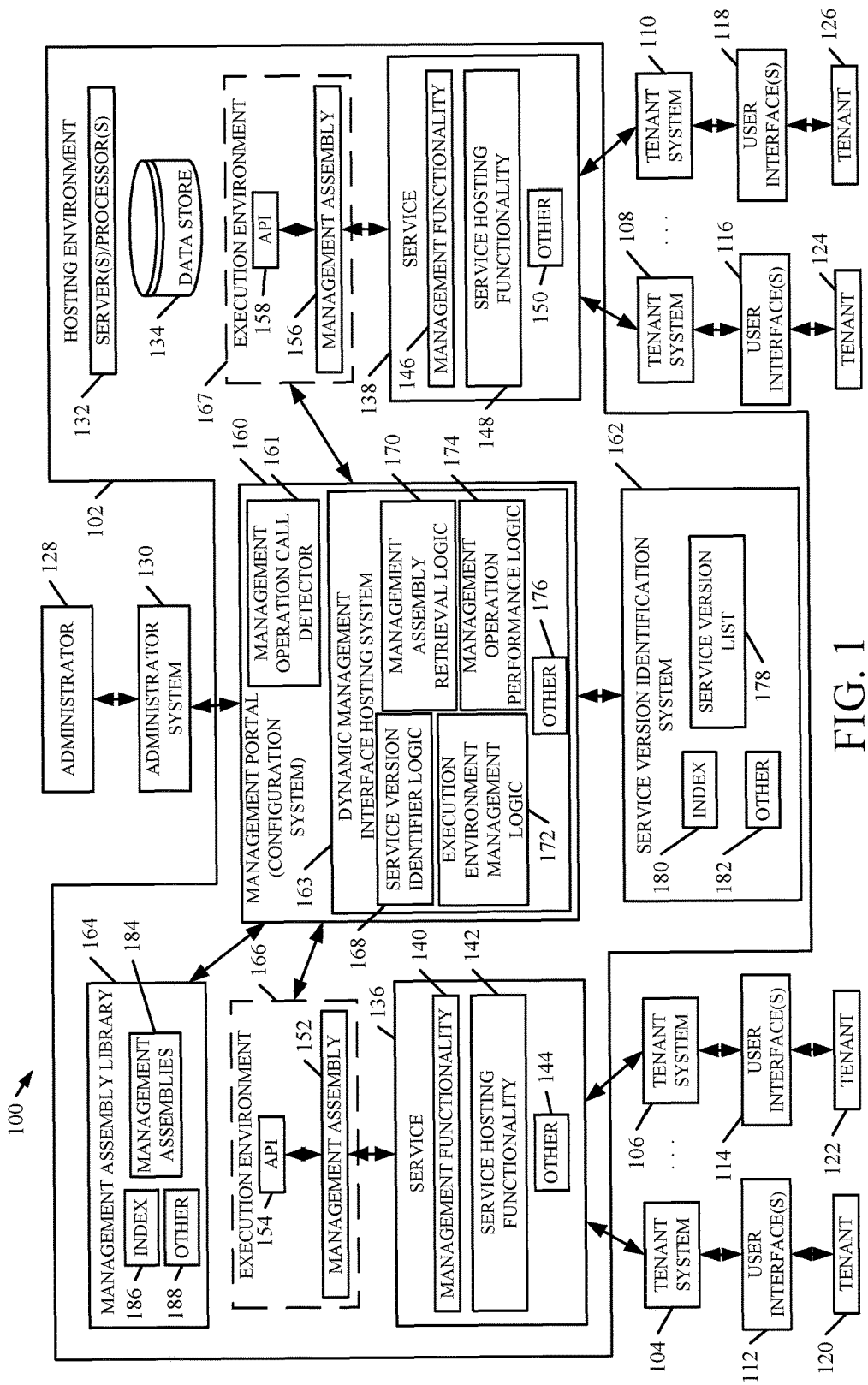
FIG. 1 is a block diagram showing one example of a service management architecture.

FIG. 1 is a block diagram of one example of a service management architecture 100. Architecture 100 illustratively includes hosting environment 102 that is accessed by a plurality of different tenant systems 104, 106, 108 and 110. Each tenant system 104-110 illustratively generates user interfaces 112, 114, 116 and 118 that include user input mechanisms that are displayed for interaction by one or more tenants 120, 122, 124 and 126, each of which illustratively has users. Tenants 120-126 illustratively interact with the user input mechanisms on user interfaces 112-118, respectively, in order to control and manipulate services that are hosted by hosting environment 102.

Architecture 100 also shows administrator 128 interacting with an administrator system 130. System 130 illustratively generates user interfaces with user input mechanisms for interaction by administrator 128. Administrator 128 illustratively interacts with those user input mechanisms in order to control and manipulate portions of hosting environment 102, as well.

Hosting environment 102, itself, illustratively includes one or more servers or processors 132, data store 134, and one or more services 136-138. Tenants 120-122 illustratively interact with service 136, while tenants 124-126 illustratively interact with service 138. Service 136 includes management functionality 140, service hosting functionality 142, and it can include a wide variety of other items 134. Service 138 illustratively includes management functionality 146, service hosting functionality 148, and it can also include a wide variety of other items 150. Service hosting functionality 142 and 148 illustratively performs service hosting functions for hosting the corresponding services 136 and 138, during runtime, for their corresponding tenants 120-126. Thus the hosting functionality 142 and 148 allows the tenants of the service to access the service to perform runtime and other operations using the service.

Management functionality 140 and 146 is illustratively used to perform management operations on the corresponding service 136 and 138, respectively. Administrator 128 may use administrator system 130 to interact with management functionality 140 or 146 to perform management functions on the corresponding service. Management functions may include, for instance, provisioning one or more new users on a service, migrating a tenant from one service to another, managing access rights and credentials on the services, commissioning and decommissioning tenants on a service, etc.

In some current systems, each and every version of a service 136-138 implements a management assembly that exposes a management application programming interface (a management API) for performing management operations on the corresponding service. Thus, for instance, assuming in FIG. 1 that services 136 and 138 are different versions of the same service, then service 136 illustratively has a management assembly 152 that exposes management API 154 that an administrator interacts with in order to perform management operations on service 136. Similarly, service 138 has a different management assembly 156 that exposes management API 158 that an administrator interacts with in order to perform management operations on service 138. In such current systems, the management assemblies 152 and 156 are tightly coupled to the particular version of the corresponding service 136-138, that they can manage. Thus, even though the consumer facing sides of API's 154 and 158 are the same, the back end may be different with different versions of the same service. They may perform version-specific operations to perform a common management operation. This makes it very difficult for a consumer of the management API to perform operations, across multiple versions of the same service.

To do this, a management architecture has needed to somehow link together all of the management assemblies, for all of the different versions of the service being managed. As the number of versions increases, this becomes very difficult. Also, when a new version is added, the new management assembly must be linked as well, creating a very brittle system.

Hosting environment 102 thus includes management portal (configuration system) 160, service version identifying system 162 and management assembly library 164. Management portal 160, itself, includes management operation call detector 161 and dynamic management interface hosting system 163. By way of overview, when administrator 128 wishes to perform a management operation on a service (say, service 136), administrator system 130 generates a call to management portal 160. Management operation call detector 161 detects the call and dynamic management interface hosting system 163 dynamically hosts a management interface for the version of the service implemented in service 136. To do so, system 163 identifies the version of the particular service 136 on which the management operations are to be performed. It uses that version to obtain the management assembly 152 for that service (which can be obtained by asking service 136 for its management assembly or by accessing it from management assembly library 164). System 163 dynamically hosts that assembly so the management operations can be performed. By dynamically hosting it is meant that the management assembly is not maintained in an execution environment unless it is needed. For instance, system 163 receives the call and, in response, then, creates an execution environment, such as execution environment 166, and loads the management assembly 152, for service 136, into that execution environment. It then allows administrator 128 to perform the management operations on service 136, using management assembly 152, and the exposed management API 154. When the management operations are complete, management portal 160 closes or otherwise discards execution environment 166, and need not maintain management assembly 152 in an execution environment until next time a call is detected to perform a management operation on the particular version of the service implemented in service 136. Of course, if management operations are to be performed on service 138, then the management assembly 156 for the version of service 138 is loaded into an execution environment 167, and the management operations are performed and the execution environment 167 is discarded in a similar way.

More specifically, dynamic management interface hosting system 163 illustratively includes service version identifier logic 168, management assembly retrieval logic 170, execution environment management logic 172, management operation performance logic 174, and it can include other items 176. Service version identification system 162 can include service version list 178, index 180, and it can include other items 182. Management assembly library 164 illustratively includes management assemblies 184 for different versions of a given service, index 186, and it can include other items 188.

Figure 2:
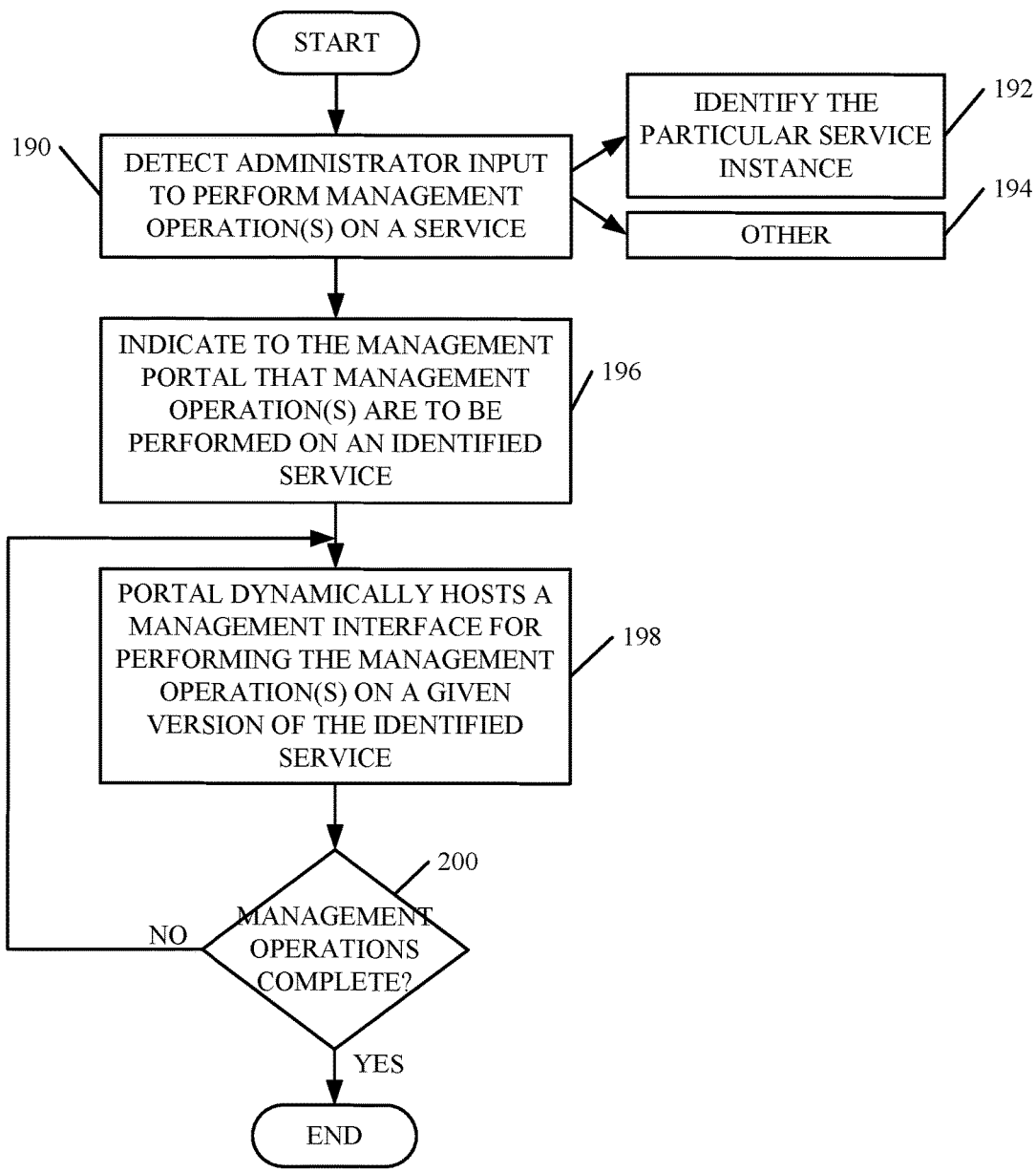
FIG. 2 is a flow diagram illustrating the overall operation of the architecture shown in FIG. 1 in hosting management interfaces for performing management operations on different versions of a service.

FIG. 2 is a flow diagram illustrating the overall operation of hosting environment 102 in performing management operations on a given service 136-138. FIGS. 1 and 2 will now be described in conjunction with one another.

Administrator system 130 first detects an administrator input from administrator 128 indicating that administrator 128 wishes to perform one or more management operations on a service. This is indicated by block 190 in FIG. 2. For the purposes of the present discussion, it will be assumed that administrator 128 wishes to perform management operations on service 136.

The input provided by administrator 128 may identify the particular service instance 136, on which the management operations are to be performed. This is indicated by block 192. The administrator input can be detected in other ways as well, and this is indicated by block 194.

Administrator system 130 then indicates to management portal 160 that management operations are to be performed on an identified service. This is indicated by block 196. It can do this by making a management call to portal 160, which is detected by call detector 161. Again, the particular service or service instance can be identified in the original administrator input, or it can be identified in subsequent, more detailed administrator inputs, or automatically, or in other ways.

In response, dynamic management interface hosting system 123 dynamically hosts a management interface that is used to perform the management operations on a given version of the identified service. This is indicated by block 198. This continues until the management operations are complete, at which time the process concludes. This is indicated by block 200 in FIG. 2.

Figure 3:
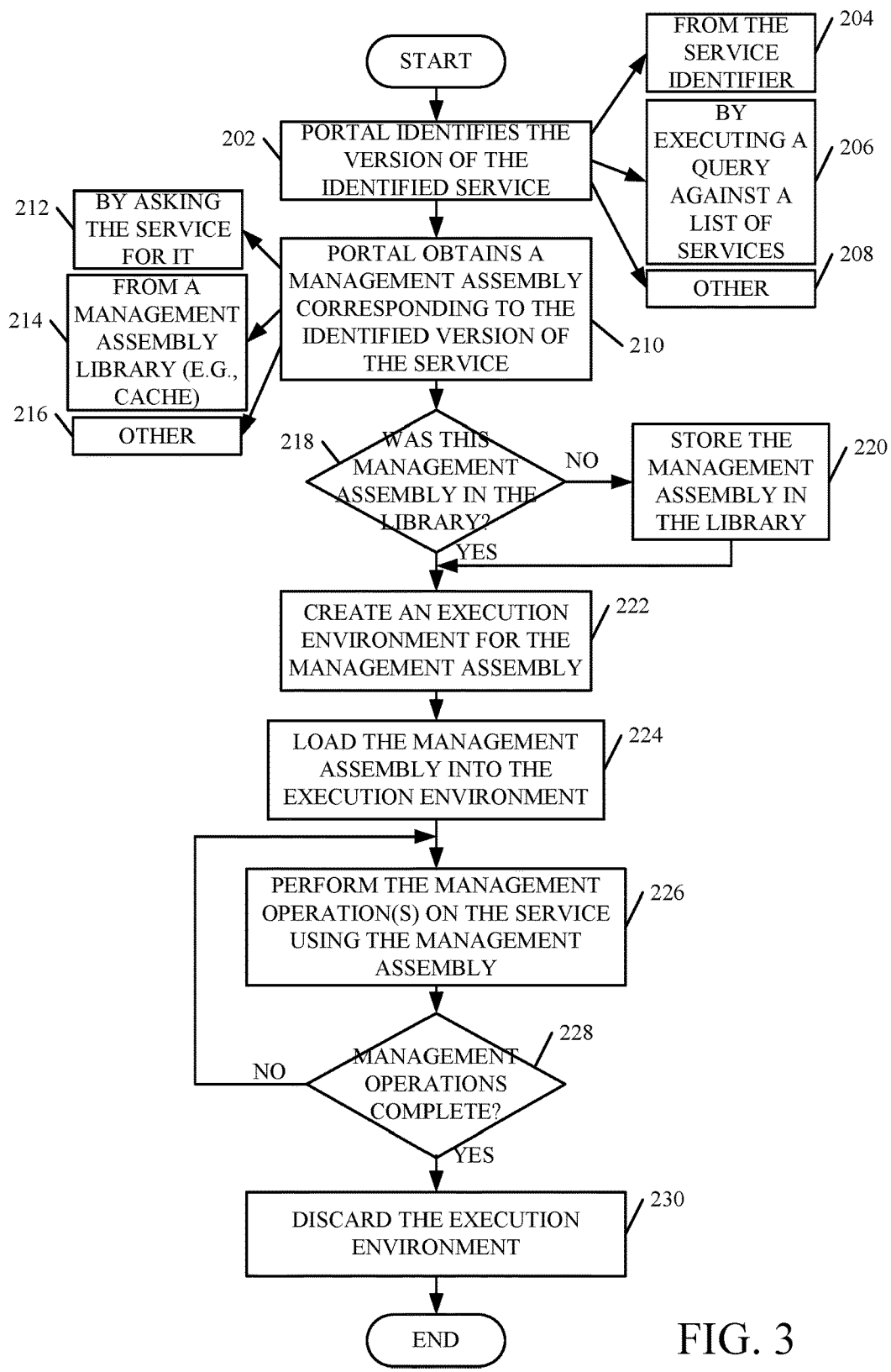
FIG. 3 is a flow diagram illustrating the operation of the architecture shown in FIG. 1 in dynamically hosting a management interface for performing management operations on different versions of the service, in more detail.

FIG. 3 is a flow diagram illustrating the operation of architecture 100 in dynamically hosting the management interface for performing the management operations on a given version of the identified service (represented by block 198 in FIG. 2), in more detail. It is assumed for the purpose of FIG. 3 that administrator system 130 has already identified a service instance to management portal 160. The service instance is the instance on which the management operations are to be performed. Service version identifier logic 168 then identifies the version of that service or service instance. This is indicated by block 202 in FIG. 3. By way of example, it may be that the service identifier provided by administrator system 130 also identifies the version of that service. This is indicated by block 204. In another example, service version identifier logic 168 executes a query against service version list 178 in service version identification system 162, in order to identify the version of the service that is about to be managed, based on the detected management call. This is indicated by block 206. For instance, system 162 may include an index 180 that indexes services or service instances in hosting environment 102. The list of versions 178 can be obtained in a wide variety of ways. For instance, when a new version of the service is loaded to the platform, the version identifier for that service (which may be stamped on the service binary that is loaded to the platform) can be loaded into list 178 and the service, and its version, can be identified in index 180. By accessing index 180, the service version identifier logic 168 can determine from the service version list the particular version of the service that is about to be managed. Identifying the version of the service to be managed can be performed in other ways as well, and this is indicated by block 208 in the flow diagram of FIG. 3.

Once the version of the service has been identified, then management assembly retrieval logic 170 obtains a management assembly corresponding to the identified version of the service. This is indicated by block 210 in FIG. 3. In one example, management portal 160 may not have obtained that management assembly from the particular service instance in the past. In that case, it can ask the service 136 for its management assembly 152. This is indicated by block 212. However, before doing so, it may access management assembly library 164 which can act as a cache of previously obtained management assemblies 184 for different versions of various services. Management assembly retrieval logic 170 may thus first query management assembly library 164 to determine whether any of the management assemblies 184 that are stored therein are the management assembly 152 for the particular version of service 136 that is about to be managed. In doing so, it may access index 186 or use other mechanisms to determine whether any of the management assemblies 184 correspond to the particular version of the service 136. Obtaining the management assembly 152 from management assembly library 164 is indicated by block 214 in the flow diagram of FIG. 3. Management assembly retrieval logic 170 can obtain the management assembly for the particular version of service 136 in other ways as well, and this is indicated by block 216.

Retrieval logic 170 also stores the retrieved management assembly 152 in library 164, if it was not already there. Thus, the management assembly 152 crosses the service boundary into portal 160, which can store it in library 164. In this way, the next time an administrator 128 wishes to perform management operations on that particular version of service 136, the management assembly 152 will be available in library 164, and need not be requested and obtained from the service 136, itself. Determining whether the management assembly 152 was already stored in library 164 and, if not, storing it there, is indicated by blocks 218 and 220 in FIG. 3.

Once the management assembly 152 has been obtained, execution environment management logic 172 creates an execution environment 166 for the management assembly 152. This is indicated by block 222 in FIG. 3. This can include a wide variety of different steps, depending on the particular hosting environment 102. Basically, logic 172 sets up the resources needed (memory, virtual machines, etc.) to host management assembly 152 and to execute operations through management assembly 152 (e.g., it configures the resources needed to execute a scripted language).

Execution environment management logic 172 then loads the management assembly 152 into the execution environment 166. This is indicated by block 224. Management assembly 152 exposes management API 154 and can now be accessed, through API 154, in order to perform management operations on the particular version of service 136.

Management operation performance logic 174 then receives inputs from administrator system 130 indicative of the particular management operations that are to be performed on service 136. It then passes them to API 154 in order to perform those operations through management assembly 152. Management functionality 140 in service 136 interacts with management assembly 152 to perform the desired management operations on service 136. Performing the management operations on the service using the management assembly 152 is indicated by block 226 in FIG. 3.

This process continues until all of the desired management operations have been performed. This is indicated by block 228. At that point, execution environment management logic 172 discards the execution environment 166, and the operations are complete. This is indicated by block 230 in FIG. 3. Discarding the execution environment 166 can be done in different ways. For instance, management assembly 152 need not be maintained in execution environment 166. The resources used in execution environment 166 can be freed for other uses. This is only one example.

It can thus be seen that the present system significantly reduces the overall size of hosting environment 102. Specifically, it greatly reduces the footprint of the management portal 160. In prior systems, management portal 160 would need to be permanently linked to all of the various management assemblies 152-156 for the different versions of the services that were being hosted by hosting environment 102. The administrator system then needed to call the correct API, so the back end of the API could interact properly with the service. This was cumbersome and made adding new services even more difficult. In contrast, the portal 160 dynamically hosts the management interfaces for performing operations on the different versions of the different services hosted in environment 102. Thus, the management assemblies need only be loaded into an execution environment when they are needed, and they can be discarded when they are not needed. Dynamically hosting the management assemblies in this way (on an as-needed basis) significantly reduces the overall resources needed for the management architecture over prior systems which maintained all management assemblies in execution environments at all times, regardless of whether they were currently needed.

In addition, because the management assemblies are maintained in a library, this also reduces the network bandwidth needed to perform the management operations. Portal 160 need not continuously ask each version of a service for its management assembly, when management operations are to be performed. Instead, it dynamically obtains the management assembly for a service only if that management assembly has not already been stored in library 164. If the management assembly has been stored in library 164, portal 160 retrieves it from a library 164 instead of needing to communicate with the service. All of these items greatly reduce the size of the management architecture needed to perform management operations on a plurality of different services, and even on a single service where different versions of that service are being hosted.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
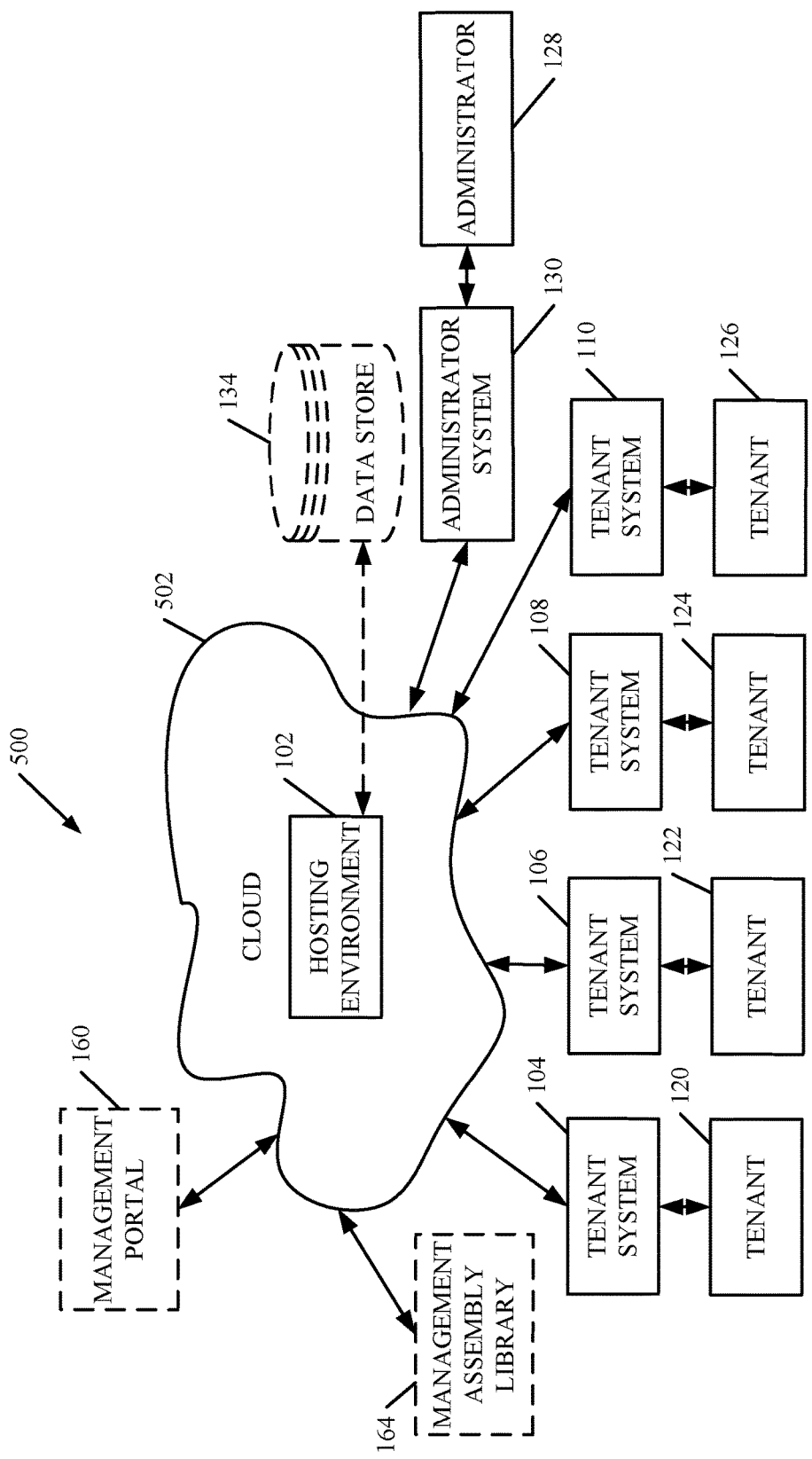
FIG. 4 shows the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that hosting environment 102 can be located in cloud 502 (which can be public, private, or a combination where portions are public while others are private). Therefore, tenants 120-126 use tenant systems 104-110, and administrator 128 uses administrator system 130 to access those systems through cloud 502.

FIG. 4 also depicts another example of a cloud architecture. FIG. 4 shows that it is also contemplated that some elements of architecture 100 are disposed in cloud 502 while others are not. By way of example, data store 134 can be disposed outside of cloud 502, and accessed through cloud 502. In another example, management portal 160 or management assembly library or other items can also be outside of cloud 502. Regardless of where they are located, they can be accessed directly by systems 104-110 and 130, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
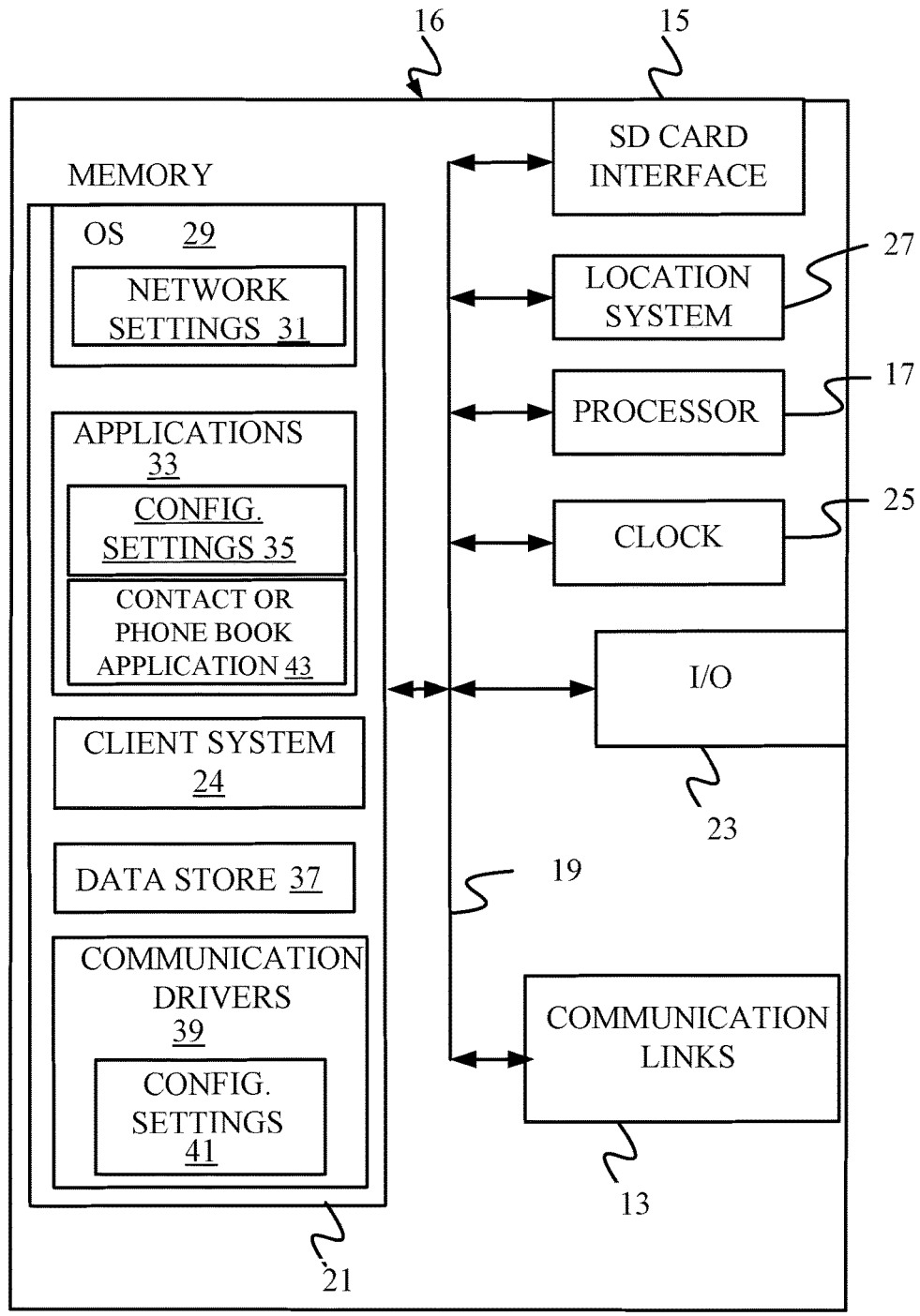
FIGS. 5-7 show various examples of mobile devices that can be used to access the services illustrated in the previous figures.
Figure 6:
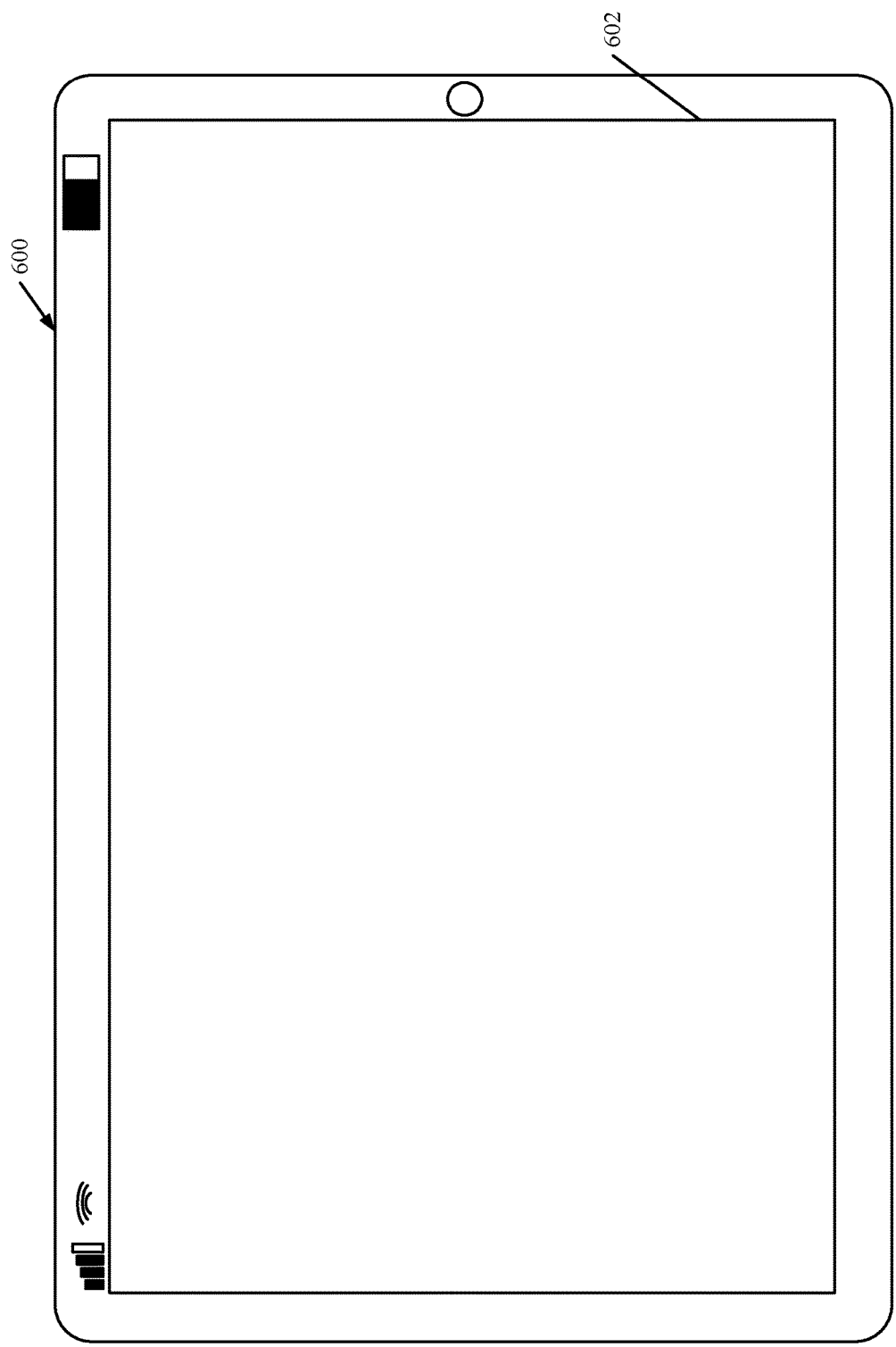
Figure 7:
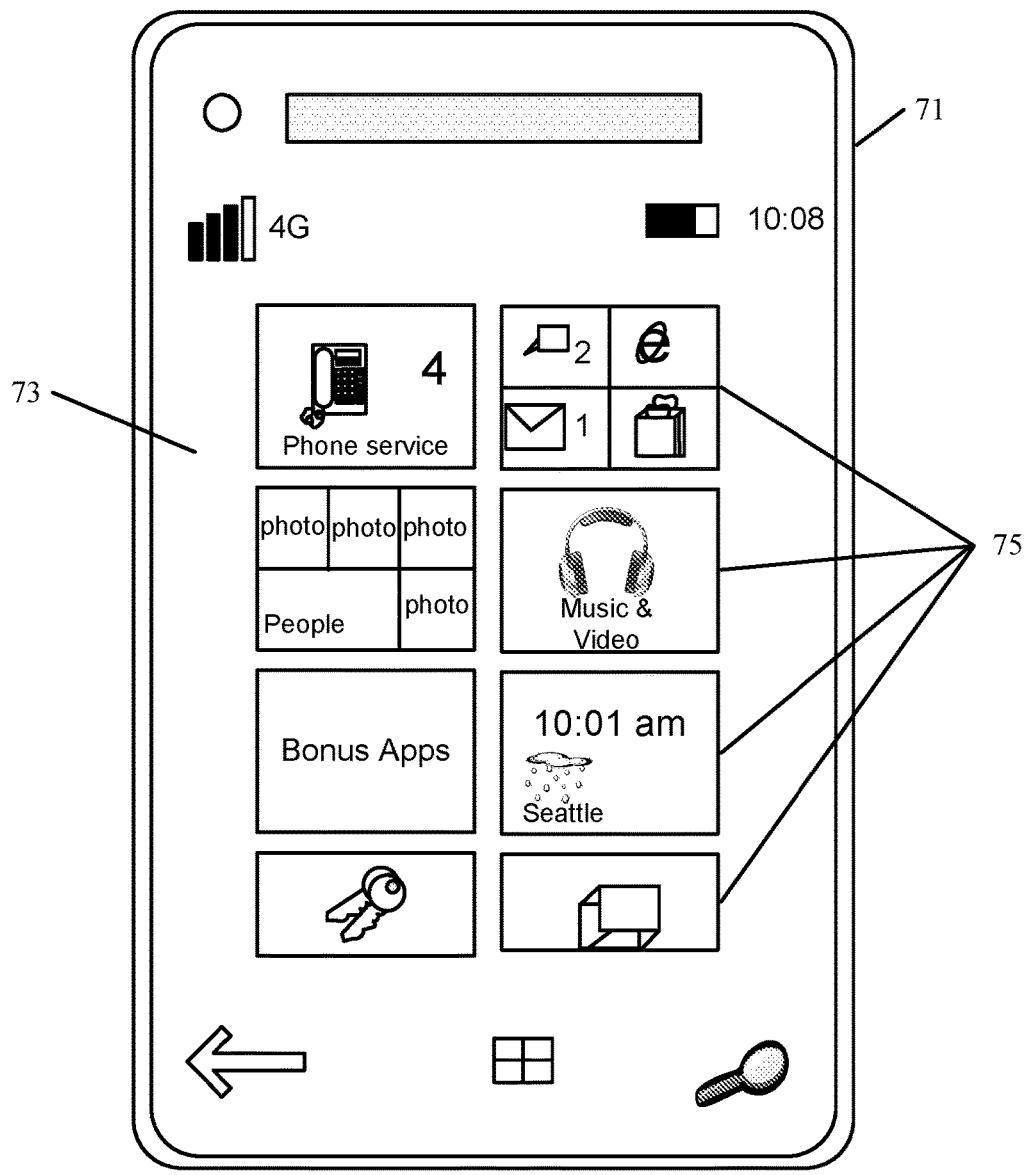

FIG. 5 is a simplified block diagram of one illustrative embodiment of a handheld or mobile computing device that can be used as a user's or client's hand held device 16, and which can be used to access the tenant systems 104-110, the administrative system 130, or hosting environment 102. FIGS. 6-7 are examples of handheld or mobile devices.

FIG. 5 provides a general block diagram of the components of a client device 16 that can run components of tenants 104-110 or system 130 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or severs 132 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
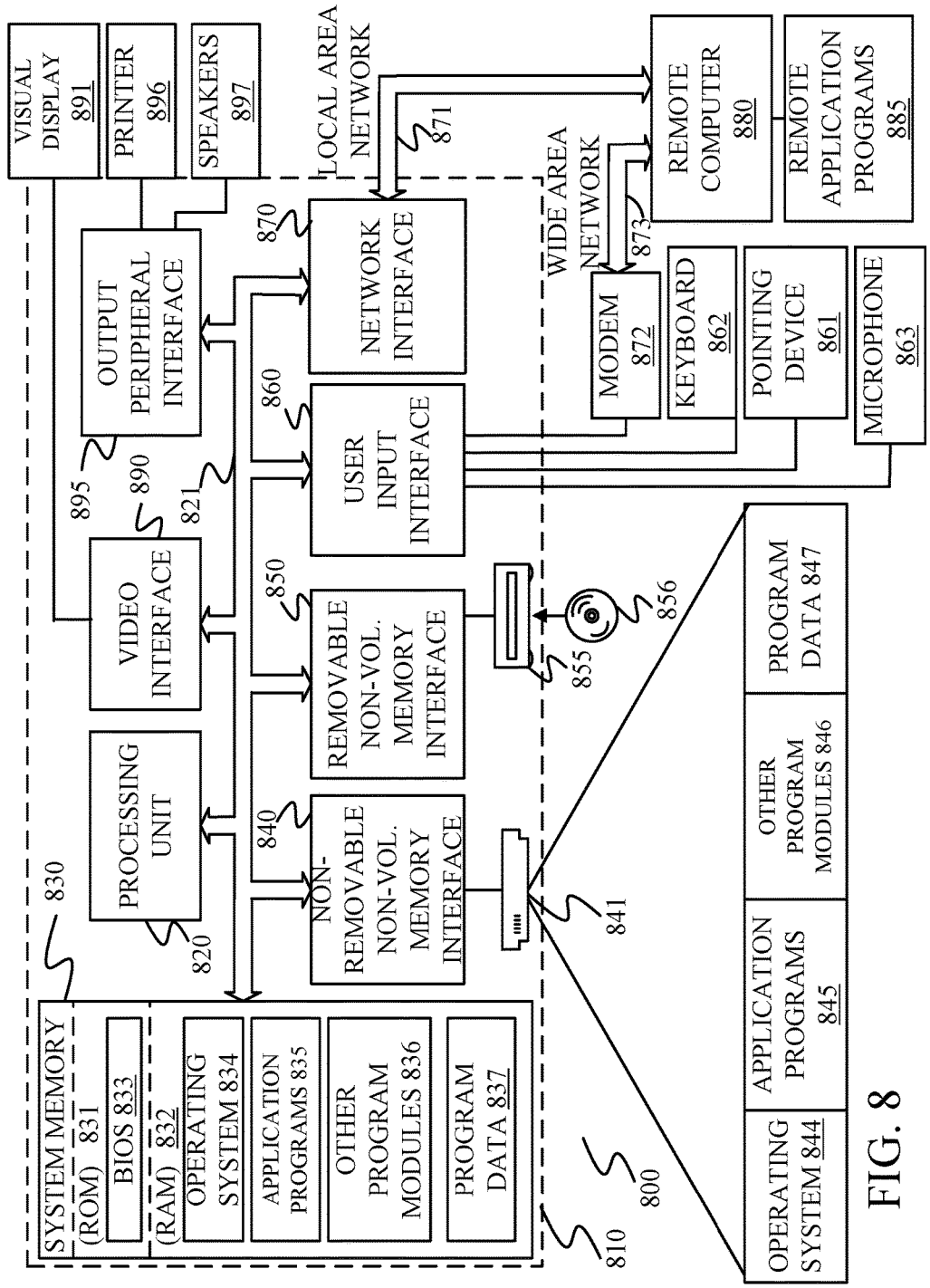
FIG. 8 is a block diagram of one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers 132 or those in the other devices discussed above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/ non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a management configuration system configured to receive a call to perform a management operation on a service having a corresponding version; and a management interface hosting system that loads a management interface, corresponding to the version of the service, into an execution environment in response to receiving the call, detects execution of the management operation on the service, through the management interface, and discards the execution environment when the management operation has been executed.

Example 2 is the computing system of any or all previous examples wherein the management interface hosting system comprises:

service version identifier logic that identifies the version of the service.

Example 3 is the computing system of any or all previous examples and further comprising:

a service version identification system that includes a searchable list of versions of hosted services, the service version identifier logic identifying the version of the service by accessing the list of versions in the service version identification system.

Example 4 is the computing system of any or all previous examples wherein the management interface hosting system comprises:

management assembly retrieval logic that obtains a management assembly for the identified version of the service.

Example 5 is the computing system of any or all previous examples and further comprising:

a management assembly library that includes a set of stored management assemblies for a plurality of different versions of the service.

Example 6 is the computing system of any or all previous examples wherein the management assembly retrieval logic is configured to access the management assembly library to determine whether the management assembly for the identified version of the service is in the management assembly library and, if so retrieve the management assembly for the identified version of the service from the management assembly library.

Example 7 is the computing system of any or all previous examples wherein the management assembly retrieval logic is configured to, in response to determining that the management assembly for the identified version of the service is not in the management assembly library, retrieve the management assembly for the identified version of the service from the service and to store the management assembly for the identified version in the management assembly library.

Example 8 is the computing system of any or all previous examples wherein the management interface hosting system comprises:

management operation performance logic configured to perform the management operation on the service through an application programming interface exposed by the management assembly loaded into the execution environment.

Example 9 is a computer implemented method, comprising:

receiving a call to perform a management operation on a service having a corresponding version;

dynamically hosting a management interface for the version of the service by loading a management assembly that exposes the management interface into an execution environment in response to the call and, after the management operation is performed on the service, discarding the execution environment; and performing the management operation on the service through the management interface exposed by the management assembly.

Example 10 is the computer implemented method of any or all previous examples wherein dynamically hosting the management interface comprises:

identifying, in response to receiving the call, the version of the service.

Example 11 is the computer implemented method of any or all previous examples wherein identifying the version of the service comprises:

executing a search against a list of versions in a service version identification system; and identifying the version of the service based on the search.

Example 12 is the computer implemented method of any or all previous examples wherein dynamically hosting the management interface comprises:

retrieving the management assembly for the identified version of the service, in response to the call and based on the identified version of the service.

Example 13 is the computer implemented method of any or all previous examples wherein retrieving the management assembly comprises:

determining whether the management assembly is in a management assembly library that includes a set of stored management assemblies for a plurality of different versions of the service; and if so, retrieving the management assembly from the management assembly library.

Example 14 is the computer implemented method of any or all previous examples wherein retrieving the management assembly comprises:

if the management assembly for the identified version of the service is not in the management assembly library, retrieving the management assembly for the identified version of the service from the service; and storing the management assembly for the identified version in the management assembly library.

Example 15 is the computer implemented method of any or all previous examples wherein performing the management operation comprises:

performing the management operation on the service through an application programming interface exposed by the management assembly loaded into the execution environment.

Example 16 is a computing system, comprising:

a management operation call detector configured to detect calls to perform management operations on a plurality of different versions of a service, each call being indicative of a management operation to be performed on a version of the service;

service version identifier logic configured to identify the version of the service on which the management operation in the detected call is to be performed; and a management interface hosting system that dynamically hosts a plurality of different management interfaces, each corresponding to a different version of the service, by, in response to the call, loading a management interface, corresponding to the identified version of the service, into an execution environment, detecting execution of the management operation on the service, through the management interface, and discarding the execution environment when the management operation has been executed.

Example 17 is the computing system of any or all previous examples wherein the management interface hosting system comprises:

management assembly retrieval logic that obtains a management assembly for the identified version of the service, the management assembly exposing an application programming interface as the management interface.

Example 18 is the computing system of any or all previous examples and further comprising:

a management assembly library that includes a set of stored management assemblies, each of the stored management assemblies corresponding to a different version of the service.

Example 19 is the computing system of any or all previous examples wherein the management assembly retrieval logic is configured to access the management assembly library to determine whether the management assembly for the identified version of the service is in the management assembly library and, if so retrieve the management assembly for the identified version of the service from the management assembly library and, if not, retrieve the management assembly for the identified version of the service from the service and store the management assembly for the identified version in the management assembly library.

Example 20 is the computing system of any or all previous examples and further comprising:

a service version identification system that includes a searchable list of versions of hosted services, the service version identifier logic identifying the version of the service by accessing the list of versions in the service version identification system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a management configuration system configured to receive
      a call to perform a management operation on a service having a particular service version; and
   a management interface hosting system configured to:
      based on the call, load a management assembly that corresponds to the particular service version into an execution environment, the management assembly being configured to interface with the particular service version to execute the management operation;
      detect the execution of the management operation on the particular service version; and
      based on detecting the execution of the management operation, discard the execution environment.

2. The computing system of claim 1 wherein the management interface hosting system comprises:
service version identifier logic configured to identify the particular service version.

3. The computing system of claim 2 and further comprising:
a service version identification system that includes a searchable list of versions of hosted services, the service version identifier logic configured to identify the particular service version by accessing the list of versions in the service version identification system.

4. The computing system of claim 2 wherein the management interface hosting system comprises:
management assembly retrieval logic configured to obtain the management assembly for the particular service version.

5. The computing system of claim 4 and further comprising:
a management assembly library that includes a set of stored management assemblies for a plurality of different service versions of the service.

6. The computing system of claim 5 wherein the management assembly retrieval logic is configured to access the management assembly library to determine whether the management assembly for the particular service version of the service is in the management assembly library and, if so retrieve the management assembly for the particular service version from the management assembly library.

7. The computing system of claim 6 wherein the management assembly retrieval logic is configured to:
in response to determining that the management assembly for the particular service version is not in the management assembly library,
retrieve the management assembly for the particular service version from the service; and
store the management assembly for the particular service version in the management assembly library.

8. The computing system of claim 4 wherein the management interface hosting system comprises:
management operation performance logic configured to perform the management operation on the service through an application programming interface exposed by the management assembly loaded into the execution environment.

9. A computer implemented method, comprising:
receiving a call to perform a management operation on a service having a particular service version;
based on the call, dynamically hosting a management interface for the particular service version by loading a management assembly into an execution environment, wherein the management assembly corresponds to the particular service version and exposes the management interface;
detecting execution of the management operation on the particular service version through the management interface exposed by the management assembly; and
based on detecting the execution of the management operation, discarding the execution environment.

10. The computer implemented method of claim 9 wherein dynamically hosting the management interface comprises:
identifying, in response to receiving the call, the particular service version.

11. The computer implemented method of claim 10 wherein identifying the version of the service comprises:
executing a search against a list of versions in a service version identification system; and
identifying the particular service version based on the search.

12. The computer implemented method of claim 10 wherein dynamically hosting the management interface comprises:
in response to the call and based on the particular service version, retrieving the management assembly for the particular service version.

13. The computer implemented method of claim 12 wherein retrieving the management assembly comprises:
determining whether the management assembly is in a management assembly library that includes a set of stored management assemblies for a plurality of different versions of the service; and
if so, retrieving the management assembly from the management assembly library.

14. The computer implemented method of claim 13 wherein retrieving the management assembly comprises:
if the management assembly for the particular service version is not in the management assembly library, retrieving the management assembly for the particular service version from the service; and
storing the management assembly for the particular service version in the management assembly library.

15. The computer implemented method of claim 12 wherein performing the management operation comprises:
performing the management operation on the service through an application programming interface exposed by the management assembly loaded into the execution environment.

16. A computing system, comprising:
a management operation call detector configured to detect calls to perform management operations on a plurality of different versions of a service, each call being indicative of a management operation to be performed on a version of the service;
service version identifier logic configured to identify the version of the service on which the management operation in the detected call is to be performed; and
a management interface hosting system that dynamically hosts a plurality of different management interfaces, each corresponding to a different version of the service, by, in response to the call, loading a management interface, corresponding to the identified version of the service, into an execution environment, detecting execution of the management operation on the service, through the management interface, and discarding the execution environment when the management operation has been executed.

17. The computing system of claim 16 wherein the management interface hosting system comprises:
management assembly retrieval logic that obtains a management assembly for the identified version of the service, the management assembly exposing an application programming interface as the management interface.

18. The computing system of claim 17 and further comprising:
a management assembly library that includes a set of stored management assemblies, each of the stored management assemblies corresponding to a different version of the service.

19. The computing system of claim 18 wherein the management assembly retrieval logic is configured to access the management assembly library to determine whether the management assembly for the identified version of the service is in the management assembly library and, if so retrieve the management assembly for the identified version of the service from the management assembly library and, if not, retrieve the management assembly for the identified version of the service from the service and store the management assembly for the identified version in the management assembly library.

20. The computing system of claim 19 and further comprising:
   a service version identification system that includes a searchable list of versions of hosted services, the service version identifier logic identifying the version of the service by accessing the list of versions in the service version identification system.

\* \* \* \* \*